US012562770B2

(12) United States Patent
Henderson et al.

(10) Patent No.: US 12,562,770 B2
(45) Date of Patent: Feb. 24, 2026

(54) CELLULAR DEVICE PRIVACY SYSTEMS AND METHODS

(71) Applicant: Integrated Solutions for Systems, Inc., Huntsville, AL (US)

(72) Inventors: Robert Henderson, Huntsville, AL (US); Glenn Rolader, Auburn, AL (US)

(73) Assignee: Integrated Solutions for Systems, Inc., Huntsville, AL (US)

( * ) Notice: Subject to any disclaimer, the term of this patent is extended or adjusted under 35 U.S.C. 154(b) by 382 days.

(21) Appl. No.: 17/951,416

(22) Filed: Sep. 23, 2022

(65) Prior Publication Data

US 2024/0106485 A1    Mar. 28, 2024

(51) Int. Cl.
H04B 1/3888 (2015.01)
H04M 1/02 (2006.01)
(Continued)

(52) U.S. Cl.
CPC ........ H04B 1/3888 (2013.01); H04M 1/0202 (2013.01); H04W 88/02 (2013.01)

(58) Field of Classification Search
CPC ........ H04B 1/3888; H04B 1/03; H04B 1/034; H04M 1/0202; H04M 1/68; H04M 1/0264; H04M 1/185; H04M 1/18; H04M 1/02; H04M 1/0206; H04M 1/0243; H04M 1/0245; H04M 1/0247; H04M 1/0249; H04M 1/0269; H04M 1/7246; H05K 5/0034; H05K 5/0039; H05K 5/003; H05K 5/0043; H05K 5/0047;

H05K 5/0052; H05K 5/0056; H05K 5/006; H05K 5/0069; H05K 7/205; H05K 9/0007; H05K 9/0022;
(Continued)

(56) References Cited

U.S. PATENT DOCUMENTS 8,380,161 B2    2/2013    Ewell, Jr.
8,924,708 B2    12/2014    Yoffe et al.
(Continued)

FOREIGN PATENT DOCUMENTS

WO    WO 2017106862 A1 *    6/2017    ............. G08B 13/22
WO    WO 2021091939 A1 *    5/2021    ........... H04B 1/3888
WO    WO 2021240523 A1 *    12/2021    ............. H04M 1/70

OTHER PUBLICATIONS (KR 20180026640 A), Privacy Protecting Camera Cover (see title) (Year: 2018).*
(Continued)

*Primary Examiner* — San Htun
(74) *Attorney, Agent, or Firm* — BRADLEY ARANT BOULT CUMMINGS LLP

(57) ABSTRACT

A system that has a protective cellular device case coupled to a cellular device and having a pocket formed by at least two layers of the protective cellular device case, the protective cellular device case further having an activation button. Further, the system has a printed circuit board (PCB) situated in a pocket formed between at least two layers of the protective cellular device case, the PCB having an oscillator and an actuator interface, the processor covers a camera and flash dock by actuating a cover via the actuator interface and interferes with microphones on the cellular device upon depression of an activation button.

62 Claims, 4 Drawing Sheets

(51) Int. Cl.
  *H04M 1/68*          (2006.01)
  *H04W 88/02*         (2009.01)
(58) Field of Classification Search
  CPC .............. H05K 9/0033; H05K 9/0037; H05K
      2201/048; H05K 2201/049; H04W 88/02;
      H04W 4/30–38; H04W 12/12–128
  See application file for complete search history.

(56)                    References Cited

U.S. PATENT DOCUMENTS

| | | | |
|---|---|---|---|
| 8,988,532 B2 | 3/2015 | Soffer | |
| 9,286,471 B2 | 3/2016 | Qureshi et al. | |
| 9,336,768 B2 | 5/2016 | Soufan et al. | |
| 9,411,379 B2 | 8/2016 | Rinner et al. | |
| 9,723,487 B2 | 8/2017 | Ramalingam et al. | |
| 10,128,890 B2 | 11/2018 | Thomas et al. | |
| 10,579,820 B2 | 3/2020 | Adams et al. | |
| 10,930,452 B2 | 2/2021 | Weaver | |
| 11,054,720 B1* | 7/2021 | Fogg .................... | G03B 11/043 |
| 2013/0221067 A1* | 8/2013 | Lee ...................... | B23K 20/106 |
| | | | 228/1.1 |
| 2015/0151515 A1* | 6/2015 | Skepton ................. | B32B 25/04 |
| 2015/0180527 A1* | 6/2015 | Fathollahi ............ | H04B 1/3888 |
| | | | 455/575.8 |
| 2015/0236743 A1* | 8/2015 | Kennedy .............. | H04B 1/3888 |
| | | | 455/575.8 |

| | | | |
|---|---|---|---|
| 2016/0098983 A1* | 4/2016 | Lehmann ................. | H04K 3/45 |
| | | | 455/575.1 |
| 2016/0234356 A1* | 8/2016 | Thomas et al. ..... | H04M 1/0202 |
| 2017/0201285 A1* | 7/2017 | Liu ....................... | H04B 1/3888 |
| 2017/0230358 A1* | 8/2017 | Hamasaki ............. | H04M 1/673 |
| 2017/0263254 A1 | 9/2017 | Dewan et al. | |
| 2018/0123631 A1* | 5/2018 | Hessabi ............... | H04B 1/3888 |
| 2018/0367183 A1* | 12/2018 | Fathollahi ............. | H04M 1/185 |
| 2019/0068768 A1* | 2/2019 | Garg ....................... | H04M 1/04 |
| 2019/0113951 A1 | 4/2019 | Tishenko | |
| 2019/0286321 A1* | 9/2019 | Kim ...................... | G06F 3/0445 |
| 2019/0369462 A1* | 12/2019 | Krause ................. | G03B 11/045 |
| 2021/0136284 A1* | 5/2021 | Gopalakrishna ....... | H04N 23/75 |
| 2022/0114287 A1* | 4/2022 | DiSalvo ................. | G06F 21/84 |
| 2023/0072301 A1* | 3/2023 | Warraiat .......... | H04M 1/72463 |

OTHER PUBLICATIONS (IP 2010193206 A), Acoustic Field Correction Method and an
Acoustic Field Correction Device (see title) ( Year: 2010).*
Ahmad, Imtiaz et al., "Tangible Privacy: Towards User-Centric
Sensor Designs for Bystander Privacy," Proceedings of the ACM on
Human-Computer Interaction, vol. 4, Issue CSCW2, Article No.
116, Oct. 15, 2020, pp. 1-28.
Gray, Stacey, "Always On: Privacy Implications of Microphone-
Enabled Devices," Future of Privacy Forum, Apr. 28, 2016, 13
pages.

\* cited by examiner

CELLULAR DEVICE PRIVACY SYSTEMS AND METHODS

BACKGROUND

Smartphone cameras are a great convenience and embody the statement that the best camera is the one that you have with you. However, smartphone cameras are also a high security risk. In this regard, the smartphone camera can be activated and used to spy on the owner. Spying via a smartphone camera can be done by installing software on the phone via physical access or using the preferred method of security services, via a remote exploitation.

Another security risk is related to a smartphone microphone, and every smartphone has a microphone. One concern is that someone may eavesdrop on private conversations. However, microphones also can be used for data collection. As an example, companies often use smartphone microphones to record the ambient noise of the owners' environments. The company may then create a database of television shows that a phone's owner has watched, and the company sells the data to advertisers so that the advertisers can target ads to those users.

DESCRIPTION OF DRAWINGS

The present disclosure can be better understood with reference to the following drawings. The elements in these drawings are not necessarily drawn to scale but are included to clearly illustrate the principles pertaining to this disclosure. Furthermore, like reference numerals designate corresponding parts throughout the views.

DETAILED DESCRIPTION

The present disclosure is a cellular device having a protective cover and components that interfere with a microphone on the cellular device and conceal one or more cameras on the cellular device for privacy. In this regard, the protective cover comprises at least two layers that are melded together. Between the layers is a printed circuit board (PCB). The PCB comprises an oscillator, amplifier, and speaker that, when activated, generates low volume noise that interferes with the microphone such that third parties are unable to discern information from the microphone regarding the user. The PCB also activates a flashing light emitting diode (LED). The flashing LED indicates the state of the device. In this regard, if the device is not secure, the PCB activates a flashing red LED that indicates to a user that the device is not secure. If the device is secure, the PCB activates a green LED that indicates to the user that the device is secure. Therefore, the user is informed as to the security of the device prior to having confidential or proprietary discussions so the user can activate the protective aspects of the protective cover prior to such conversations. Further, the protective cover has a mechanical actuator interface that activates a covering, moving the covering to conceal one or more cameras on the cellular device.

Figures 1, 2:
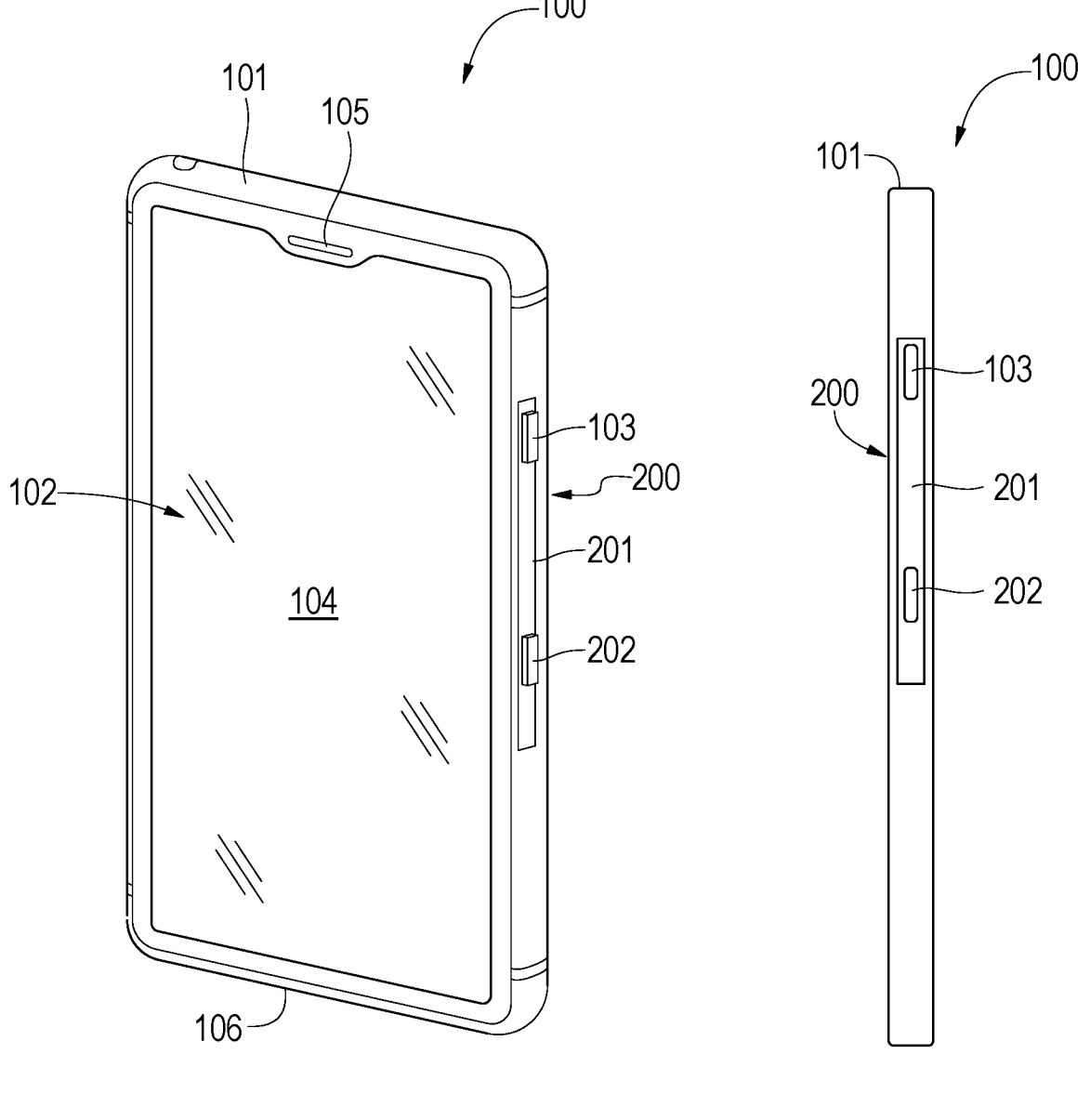
FIG. 1 is an exemplary cellular device in a protective case in accordance with an embodiment of the present disclosure.
FIG. 2 is a right side view of the exemplary cellular device in the protective case such as is shown in FIG. 1.

FIG. 1 is a cellular device privacy system 100 comprising an exemplary cellular device 102 in an exemplary protective cellular device case 101 in accordance with an embodiment of the present disclosure. Note that the cellular device 102 may be, for example, a smartphone or tablet. Further note that the exemplary protective cellular device case 101 is any type of protective case that fits snugly onto the cellular device 102 exposing the display 104, a power button (not shown), one or more microphones 105, a speaker 106, cameras (not shown), and volume buttons (not shown).

On a right side of the protective cellular device case 101 is an activation device 200. In one embodiment, the activation device 200 comprise a longitudinal, rectangular channel 201. The activation device 200 further comprises a slider button 103 and an activation button 202.

In operation, a user (not shown) depresses the slider button 103. Upon depressing the slider button 103, the user slides the slider button 103 longitudinally downward. When the slider button 103 reaches an activation button 202, the slider button 103 depresses the activation button 202.

When the activation button 202 is depressed, a printed circuit board (not shown) (PCB) within a layer of the protective cellular device case 101 is activated. The PCB switches on an oscillator (not shown) that interferes with the one more microphones 105. Thus, a third party (not shown) is not capable of listening through the microphones 105 remotely. Also, when the activation button 202 is depressed, a cover (not shown) is actuated moving horizontally in front of the cameras thereby blocking a third party from viewing user's surroundings remotely via the cameras. Note that only a single microphone 105 is shown; however, there may be additional microphones, for example, on the bottom 106 of the cellular device 102.

FIG. 2 is a side view of the cellular device privacy system 100. The cellular device privacy system 100 comprises the protective cellular device case 101 and the cellular device 102 (FIG. 1). The protective cellular device case 101 fits snugly about the cellular device 102, exposing the display 104 (FIG. 1), a power button (not shown), one or more microphones 105 (FIG. 1), a speaker 106 (FIG. 1), cameras (not shown), and volume buttons (not shown).

On the right side of the protective cellular device case 101 is the activation device 200. In one embodiment, the activation device 200 comprise a rectangular channel 201. In this regard, the activation device 200 further comprises a slider button 103 and an activation button 202.

In operation, a user (not shown) depresses the slider button 103. Upon depressing the slider button 103, the user slides the slider button 103 downward. When the slider button 103 reaches an activation button 202, the slider button 103 depresses the activation button 202.

When the activation button 202 is depressed, a printed circuit board (not shown) (PCB) within the protective cellular device case 101 is activated. The PCB switches on an oscillator (not shown) that interferes with the one more microphones 105. Thus, a third party (not shown) is not capable of listening through the microphones 105 remotely. Also, when the activation button 202 is depressed, a cover (not shown) is actuated moving horizontally in front of the cameras thereby blocking a third party from viewing user's surroundings remotely via the cameras (FIG. 1).

Figures 3, 4:
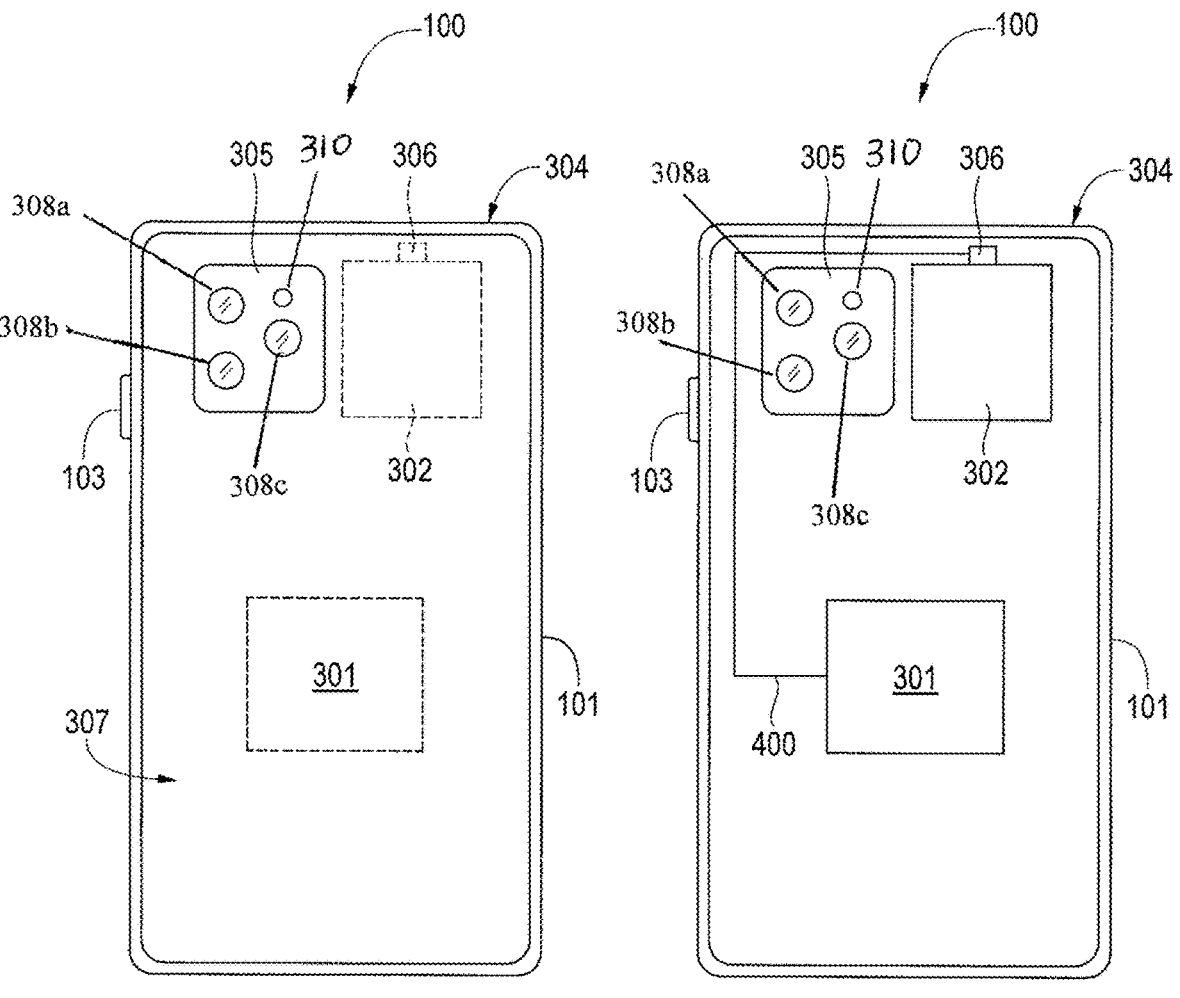
FIG. 3 is a back view of the exemplary cellular device in the protective case such as is shown in FIG. 1 showing hidden components residing within a layer of the protective case.
FIG. 4 is a back view of the exemplary cellular device in the protective case such as is shown in FIG. 1 showing the components residing within the layer of the protective case.

FIG. 3 is a back view of the exemplary cellular device privacy system 100 comprising a cellular device 102 in the protective cellular device case 101. The cellular device 102 comprises a plurality of components residing within a layer of the protective cellular device case 101 and residing on a printed circuit board (PCB) 301. In this regard, a layer 307 of the protective cellular device case 101 encompasses and protects components of the cellular device privacy system 100, e.g., the PCB 301 and a cover 302 coupled to an actuator 306. Notably, the layer 307 forms a pocket with an underlying layer of the protective cellular device case 101. The cellular device 102 also comprises one or more cameras 308a, 308b, 308c on a flash dock 305.

Within the layer 307 of the protective cellular device case 101 is the PCB 301 that is electrically and communicatively coupled to the actuator 306. Further, the cellular device privacy system 100 comprises a square cover 302 that is coupled to the actuator 306. Notably, when the actuator 306 is activated by a signal from the PCB 301, the cover 302 moves horizontally to the left to cover the cameras 308a, 308b, 308c and the flash 310. The cover 302 eliminates the risk that a third party accesses the camera 308a, 308b, 308c and flash 310 and view the user's environs.

FIG. 4 is a back view of the exemplary cellular device privacy system 100 with the layer 307 (FIG. 3) removed from the protective cellular device case 101. The exemplary cellular device privacy system 100 comprises the cellular device 102 (FIG. 1) and the protective cellular device case 101.

The cellular device privacy system 100 further comprises the printed circuit board (PCB) 301 that is communicatively coupled to the actuator 306. The actuator is fixedly coupled to the cover 302. In operation, when the user (not shown) slides the slider button 103 to depress activation button 202 (FIG. 1), the PCB 301 transmits an actuation signal via connection 400 to the actuator 306. Upon receipt, the actuator 306 moves the cover 302 over the cameras 308a, 308b, 308c and flash dock 305. This ensures that third parties are unable to access the cameras 308a, 308b, 308c and view the user in his/her environs.

Figure 5:
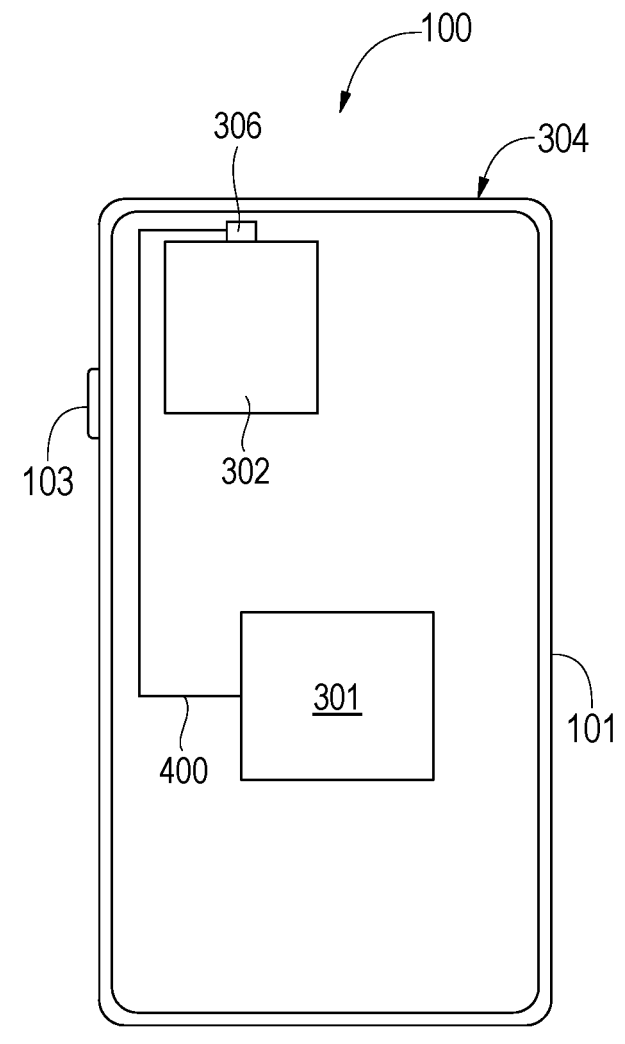
FIG. 5 is a back view of the exemplary cellular device in the protective case such as is shown in FIG. 1 showing a covering concealing one or more cameras on the exemplary cellular device.

FIG. 5 is a back view of the exemplary cellular device privacy system 100 with the layer 307 (FIG. 3) removed from the protective cellular device case 101. The slider button 103 is shown longitudinally moved downward. Thus, the user (not shown) has depressed the slider button 103 and moved the slider button 103 longitudinally downward thereby activating the printed circuit board (PCB) 301 via the activation button 202 (FIG. 2).

The actuator 306 receives a signal from the printed circuit board (PCB) to close the cover 302 over the cameras 308a, 308b, 308c and flash dock 305 (FIG. 3) when the user moves the slider button 103 longitudinally downward. When the slider button 103 is moved longitudinally downward, the slider button 103 depresses the activation button 202 (FIG. 1). The activation depression transmits a signal to the PCB 301. Upon receipt, the PCB 301 activates an oscilloscope (not shown) that interferes with microphones 105 and any other microphone on the cellular device 102 (FIG. 1). Thus, third parties are unable to access the microphones 105 or other microphones to listen to the user in his/her environs.

Note that an actuator 306 is described for moving the cover 302 over the cameras 308a, 308b, 308c and flash dock 305. In other embodiments, the cover 302 may be moved by a mechanical device (not shown) instead of the actuator 306.

In addition, the PCB 301 transits a signal to the actuator 306. Upon receipt of the signal, the actuator 306 moves the cover 302 over the cameras 308a, 308b, 308c and flash dock 305 (FIG. 3). Thus, third parties are unable to access the cameras 308a, 308b, 308c and flash dock 305 to visually spy on the user in his/her environs.

Figure 6:
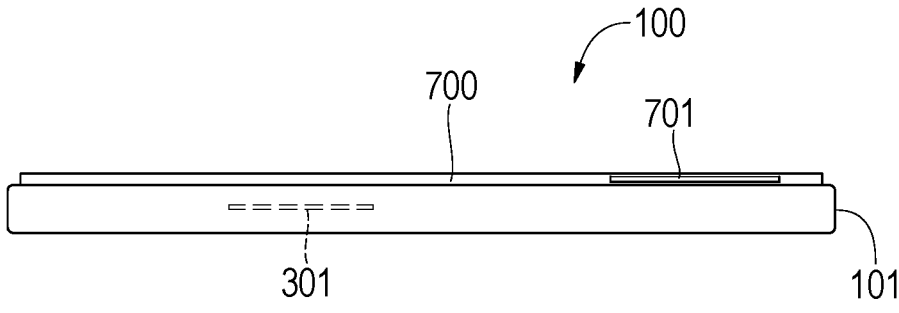
FIG. 6 is a right side view of the exemplary cellular device in the protective case such as is shown in FIG. 1 and having a slot through which the covering exits to cover the one or more cameras on the exemplary cellular device.

FIG. 6 is a left side view of the cellular device privacy system 100. The cellular device privacy system 100 comprises a raised thin housing 700. Within the raised thin housing 700 is a slot 701. The cover 302 resides in the raised thin housing 700 in the slot 701 when not activated. When the printed circuit board (PCB) 301 transmits a signal to the actuator 306 (FIG. 3), the actuator 306 moves the cover horizontally through the slot 701 to conceal the cameras 308a, 308b, 308c and flash dock 305.

Figure 7:
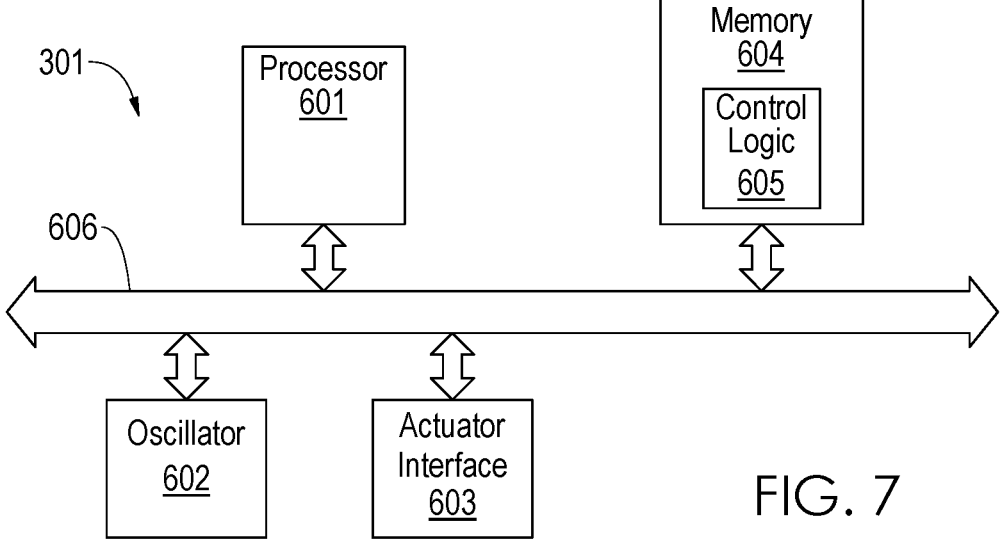
FIG. 7 is a block diagram of an exemplary printed circuit board (PCB) contained within a layer of the protected case.

FIG. 7 is a block diagram of an exemplary printed circuit board (PCB) 301 in accordance with an embodiment of the present disclosure. The PCB 301 comprises a processor 601 and memory 604.

Stored in memory 604 is control logic 605. The control logic 605 is for controlling the PCB 301. The control logic 605 may be software, hardware, firmware, or a combination thereof.

The exemplary embodiment of the cellular device privacy system 100 depicted by FIG. 2 comprises the processor 601, such as a digital signal processor (DSP) or a central processing unit (CPU), that communicates to and drives the other elements within the cellular device privacy system 100 via a local interface 606, which can include at least one bus. Further, the processor 601 is configured to execute instructions of software, such as the control logic 605.

Further, the PCB 301 comprises a circuit containing an oscillator, amplifier, piezo electric speaker and other supporting components, which can be any type of device for interfering with microphones 105 (FIG. 1) on the cellular device privacy system 100. Note that the oscillator is a type of device that generates oscillatory electric currents or voltages by nonmechanical means. The signal generated by the PCB circuit can be varied by the PCB to ensure that software manufacturers cannot devise noise cancellation algorithms for the microphone that would render the PCB noise generator useless.

When the control logic 605 receives a signal from depressed activation button 202 (FIG. 1), the control logic 605 activates the oscillator 602. The active oscillator 602 generates electronic noise which blocks microphones 105 (FIG. 1) on the cellular device 102 (FIG. 1) so that third parties are unable to hear the user in his/her environs.

Further, the control logic 605 transmits a signal via the actuator interface 603 to the actuator 306. Upon receipt of the signal from the PCB 301, the actuator 306 moves the cover 302 (FIG. 3) over the cameras 308a, 308b, 308c and flash dock 305 (FIG. 3). When the cameras 308a, 308b, 308c and flash dock 305 is covered, third parties are unable to see the user in his/her environs.

Figure 8:
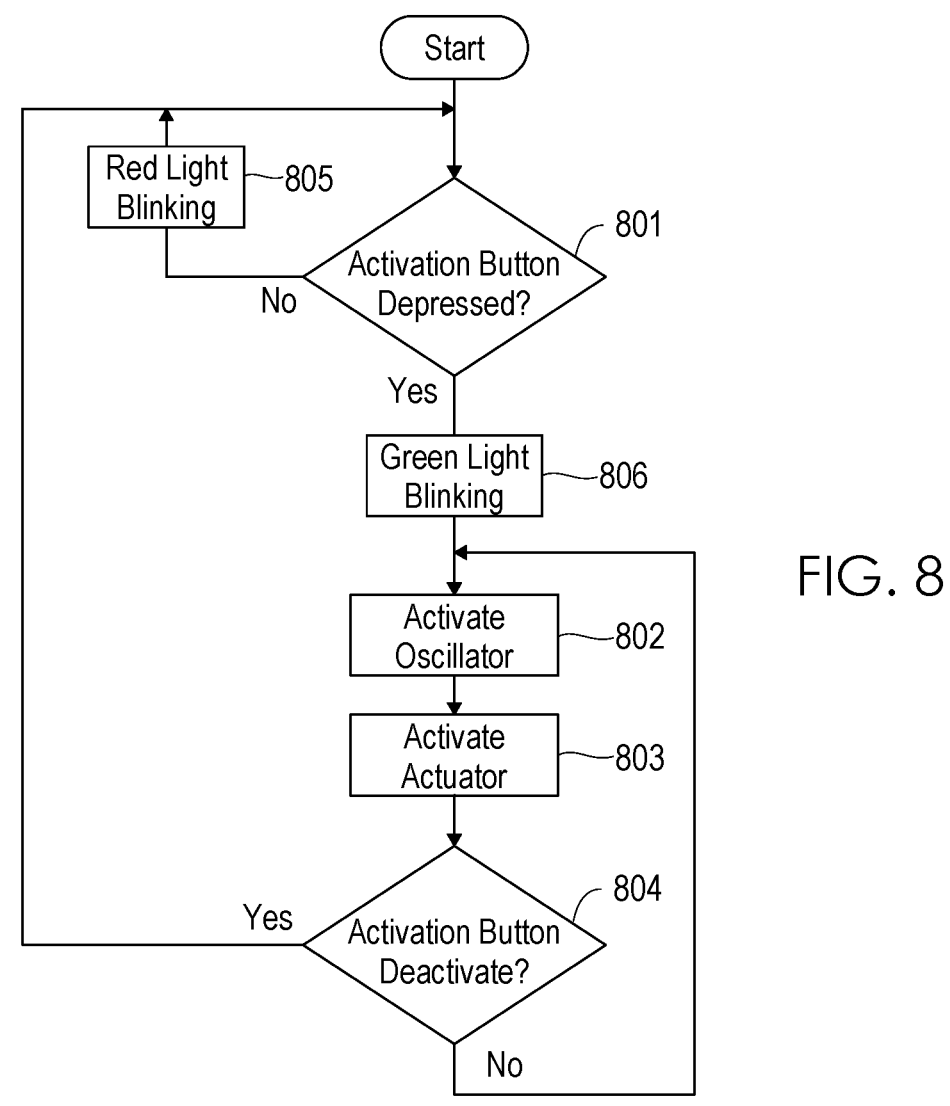
FIG. 8 is a block diagram of exemplary architecture and functionality of the system as shown in FIG. 1.

FIG. 8 is a block diagram of exemplary architecture and functionality of the cellular device privacy system 100.

In step 801 the control logic 605 (FIG. 6) is listening for an activation signal from the activation button 202 (FIG. 1). If the activation button 202 is depressed in step 801, the control logic 605 activates a green light emitting diode in step 806. Further, the control logic 605 activates the oscillator 602 (FIG. 7) in step 802. When activated, the oscillator 602 interferes with microphones 105 (FIG. 1) so that a third party is unable to listen to the user in his/her environs.

Further, the control logic 605 transmits a signal to a device for moving the cover 302 (FIG. 3). In one embodiment, the device is an actuator and the actuator 306 (FIG. 3) moves the device via the actuator interface 603. In another embodiment, the device for moving the cover 302 may be, for example mechanical as opposed to electromechanical. Upon activation, the actuator 306 moves the cover 302 (FIG. 3) horizontally to cover the cameras 308*a*, 308*b*, 308*c* and flash dock 305 (FIG. 3).

If the activation button 202 is deactivated in step 804, e.g., the slide button is moved longitudinally upward, the activation button 202 transmits a signal to the control logic 605. The control logic 605 activates a red light-emitting diode LED and deactivates the oscillator 602. Further, upon receiving the signal, the control logic 605 transmits a signal to the actuator 306 via the actuator interface 603, and the actuator 306 moves the cover 302 horizontally to uncover the cameras 308*a*, 308*b*, 308*c* and flash dock 305.

What we claim is:

1. A system, comprising:
a protective cellular device case coupled to a cellular device and comprising a printed circuit board (PCB) and an activation button;
wherein the PCB comprises an oscillator;
responsive to activation upon depression of the activation button, the PCB activates the oscillator to interfere with a microphone integral with the cellular device; and
wherein the PCB transmits a signal to an actuator that actuates a cover to conceal one or more cameras on the cellular device.

2. The system of claim 1, wherein the protective cellular device case comprises a channel slidably coupled to a slider button.

3. The system of claim 2, wherein longitudinally downward from the slider button is the activation button.

4. The system of claim 3, wherein the activation button is activated by sliding the slider button longitudinally downward to depress the activation button.

5. The system of claim 1, wherein the actuator moves the cover horizontally to cover the one or more cameras and a flash dock.

6. The system of 5, wherein the cover resides in a raised thin housing.

7. The system of claim 6, wherein the raised thin housing comprises a slot.

8. The system of claim 7, wherein the cover egresses and ingresses via the slot to cover and uncover the one or more cameras and the flash dock when activated by the processor.

9. The system of claim 1, further comprising an amplifier.

10. The system of claim 9, wherein the amplifier amplifies a signal from the oscillator.

11. The system of claim 10, further comprising a speaker.

12. The system of claim 11, wherein responsive to activation, the oscillator generates low volume noise.

13. The system of claim 12, wherein the low volume noise generated by the oscillator is amplified by the amplifier.

14. The system of claim 13, wherein the speaker outputs the low volume noise generated by the oscillator and amplified by the amplifier, and the output interferes with the microphone such that third parties are unable to discern information from the microphone.

15. The system of claim 1, wherein responsive to activation, the PCB activates a light emitting diode having a color that indicates that the cellular device is protected.

16. The system of claim 15, wherein the color is green.

17. The system of claim 4, wherein when the activation button is not depressed, the PCB activates a light emitting diode having a color that indicates that the cellular device is not protected.

18. The system of claim 17, wherein the color is red.

19. The system of claim 1, further comprising:
a device for moving a cover over one or more cameras and flash dock; and
wherein the device for moving the cover is an electromechanical actuator.

20. The system of claim 1, further comprising:
a device for moving a cover over one or more cameras and flash dock; and
wherein the device for moving the cover is mechanical.

21. A method for protecting a user's cellular device, comprising:
coupling a protective cellular device case to a cellular device, wherein the protective cellular device case comprises a printed circuit board (PCB) and an activation button;
wherein the PCB comprises an oscillator;
activating, by the PCB, the oscillator, to interfere with a microphone integral with the cellular device;
amplifying a signal from the oscillator with an amplifier, and transmitting the amplified signal to a speaker that outputs the signal thereby interfering with the microphone on the cellular device; and
wherein the steps of activating and amplifying are executed upon depression of the activation button.

22. The method of claim 21, further comprising covering one or more cameras and flash dock by moving a cover over the one or more cameras and the flash dock.

23. The method of claim 21, further comprising interfering with the microphone on the cellular device upon depression of the activation button.

24. The method of claim 21, wherein the protective cellular device case comprises a channel slidably coupled to a slider button, further comprising sliding the slider button for activation.

25. The method of claim 24, wherein longitudinally downward from the slider button is the activation button, further comprising moving the slider button longitudinally downward to activate the activation button.

26. The method of claim 25, wherein the activation button is activated by sliding the slider button longitudinally downward to depress the activation button.

27. The method of claim 21, further comprising receiving a signal from the oscillator by an amplifier.

28. The method of claim 27, further comprising receiving the signal from the oscillator by a speaker and broadcasting the signal to interfere with the microphone on the cellular device.

29. The method of claim 21, further comprising transmitting a signal to an actuator that actuates a cover to conceal one or more cameras on the cellular device.

30. The method of claim 29, wherein the actuator moves the cover horizontally to cover the one or more cameras and a flash dock.

31. The method of claim 30, further comprising a mechanical device coupled to the cover.

32. The method of claim 31, wherein the mechanical device moves the cover to conceal the one or more cameras and the flash dock upon depression of the activation button.

33. The method of 22, further comprising coupling the cover in a raised thin housing comprising a slot opening.

34. The method of claim 33, wherein the cover egresses and ingresses via the slot opening to cover and uncover the one or more cameras and the flash dock when activated by the PCB.

35. The method of claim 21, further comprising amplifying a signal from the oscillator by an amplifier.

36. The method of claim 35, further comprising receiving an amplified signal from the amplifier.

37. The method of claim 36, further comprising broadcasting the amplified signal via a speaker.

38. The method of claim 21, wherein when the activation button is depressed, the oscillator generates low volume noise.

39. The method of claim 38, wherein the low volume noise generated by the oscillator is amplified by an amplifier.

40. The method of claim 39, further comprising outputting the low volume noise generated by the oscillator and amplified by the amplifier, and the output interferes with the microphone such that third parties are unable to discern information from the microphone.

41. The method of claim 21, further comprising activating a light emitting diode (LED) that indicates that the cellular device is protected.

42. The method of claim 41, further comprising activating a green LED when the cellular device is protected.

43. The method of claim 21, further comprising activating a light emitting diode (LED) that indicates that the cellular device is not protected.

44. The method of claim 43, further comprising activating a red LED that indicates the cellular device is not protected.

45. The method of claim 22, wherein an electromechanical device moves the cover.

46. The method of claim 22, wherein a mechanical device moves the cover.

47. The system of claim 1, wherein the protective cellular device case comprises a pocket formed by at least two layers of the protective cellular device case.

48. The system of claim 47, wherein the PCB is positioned in the pocket.

49. The system of claim 1, wherein responsive to activation, third parties are unable to discern information from the microphone.

50. The system of claim 1, wherein the PCB comprises a circuit containing the oscillator, an amplifier, and a speaker.

51. The system of claim 1, wherein the oscillator generates oscillatory electric currents.

52. The system of claim 1, wherein the oscillator generates electric currents that periodically reverse direction.

53. The system of claim 1, wherein the oscillator generates a signal that varies in current.

54. The system of claim 1, wherein the oscillator generates oscillatory electric voltages.

55. The system of claim 1, wherein the oscillator generates a voltage that varies periodically.

56. The system of claim 1, wherein the oscillator generates a signal that varies in voltage.

57. The system of claim 1, wherein the PCB transmits a signal to activate the oscillator.

58. The system of claim 57, wherein the signal is varied by the PCB to ensure that third parties cannot devise noise cancellation algorithms for the microphone rendering a noise generator of the PCB inoperable.

59. The system of claim 1, wherein responsive to activation, the oscillator generates electronic noise.

60. The system of claim 59, wherein the electronic noise blocks the microphone to ensure that third parties are unable to discern information from the microphone.

61. The system of claim 1, wherein responsive to activation, the oscillator interferes with the microphone such that third parties are unable to discern information from the microphone.

62. A system, comprising:

a protective cellular device case coupled to a cellular device and comprising a printed circuit board (PCB) and an activation button;

wherein the PCB comprises an oscillator;

responsive to activation upon depression of the activation button, the PCB activates the oscillator to interfere with a microphone integral with the cellular device by generating low volume noise;

an amplifier, wherein the low volume noise generated by the oscillator is amplified by the amplifier; and a speaker, wherein the speaker outputs the low volume noise generated by the oscillator and amplified by the amplifier.

* * * * *